(12) United States Patent
Yamanaka

(10) Patent No.: US 9,108,502 B2
(45) Date of Patent: Aug. 18, 2015

(54) CABLE ROUTING STRUCTURE

(71) Applicant: Kenshi Yamanaka, Nukata-gun (JP)

(72) Inventor: Kenshi Yamanaka, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 14/091,772

(22) Filed: Nov. 27, 2013

(65) Prior Publication Data

US 2014/0151086 A1    Jun. 5, 2014

(30) Foreign Application Priority Data

Nov. 30, 2012    (JP) ................................. 2012-263578

(51) Int. Cl.
*B60K 1/00*        (2006.01)
*B60K 6/40*        (2007.10)

(52) U.S. Cl.
CPC ........................................ *B60K 6/40* (2013.01)

(58) Field of Classification Search
CPC ........ H01B 9/006; B60K 1/00; B60L 11/123; B60L 11/14; B60L 11/1868; B60L 11/1877; B60L 5/20; Y02T 10/7066; Y02T 10/7005; Y02T 10/7077; Y02T 10/7241
USPC ............................................ 180/65.1, 65.22
See application file for complete search history.

(56) References Cited

U.S. PATENT DOCUMENTS

| | | | | |
|---|---|---|---|---|
| 6,460,642 | B1 * | 10/2002 | Hirano | 180/65.1 |
| 8,390,253 | B2 * | 3/2013 | Arai et al. | 320/109 |
| 8,517,127 | B2 * | 8/2013 | Kanno | 180/65.1 |
| 8,794,365 | B2 * | 8/2014 | Matsuzawa et al. | 180/68.5 |
| 2003/0034186 | A1 * | 2/2003 | Morita et al. | 180/65.1 |
| 2004/0211613 | A1 | 10/2004 | Asao et al. | |
| 2008/0197810 | A1 * | 8/2008 | Ishikawa et al. | 320/135 |
| 2009/0120661 | A1 * | 5/2009 | Inoue et al. | 174/110 SR |
| 2010/0066166 | A1 * | 3/2010 | Yoshinaga et al. | 307/9.1 |
| 2012/0112537 | A1 * | 5/2012 | Fukazu et al. | 307/10.1 |
| 2013/0119760 | A1 * | 5/2013 | Amano et al. | 307/10.1 |
| 2013/0162075 | A1 * | 6/2013 | Chinavare et al. | 310/85 |
| 2013/0241282 | A1 * | 9/2013 | Ikeno et al. | 307/10.1 |
| 2014/0090908 | A1 * | 4/2014 | Amano et al. | 180/65.1 |
| 2014/0151086 | A1 * | 6/2014 | Yamanaka | 174/138 R |
| 2014/0319909 | A1 * | 10/2014 | Suzuki et al. | 307/10.1 |

FOREIGN PATENT DOCUMENTS

| | | | |
|---|---|---|---|
| JP | 2004328870 A | 11/2004 | |
| JP | 2010264793 A | 11/2010 | |
| WO | 2013168227 A1 | 11/2013 | |

* cited by examiner

*Primary Examiner* — Brodie Follman
(74) *Attorney, Agent, or Firm* — Kenyon & Kenyon LLP

(57) ABSTRACT

A cable routing structure includes a drive train within which an electric motor is housed; a power control unit configured to supply alternating current to the electric motor, the power control unit being fixed to an upper portion of the drive train, and on-board components being arranged on both sides of the power control unit in a lateral direction of a vehicle; an electrical component being arranged on a side of a plane that the power control unit is on; and a first end of a first cable being connected to a side surface of the power control unit that faces toward a front or a rear of the vehicle, a second end of the first cable being connected to the electrical component, and the first cable being routed through a space defined by the power control unit and the drive train.

6 Claims, 2 Drawing Sheets

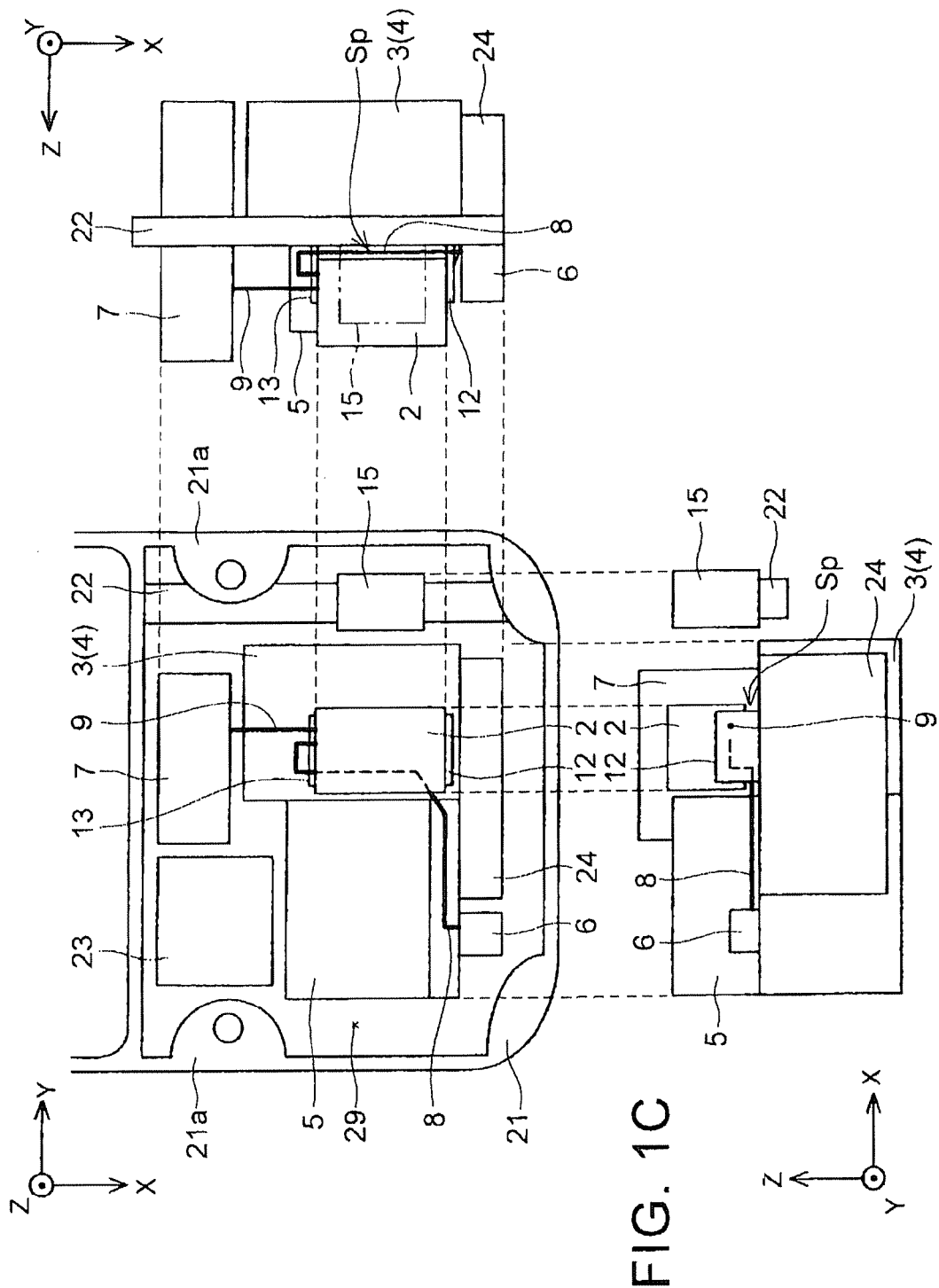

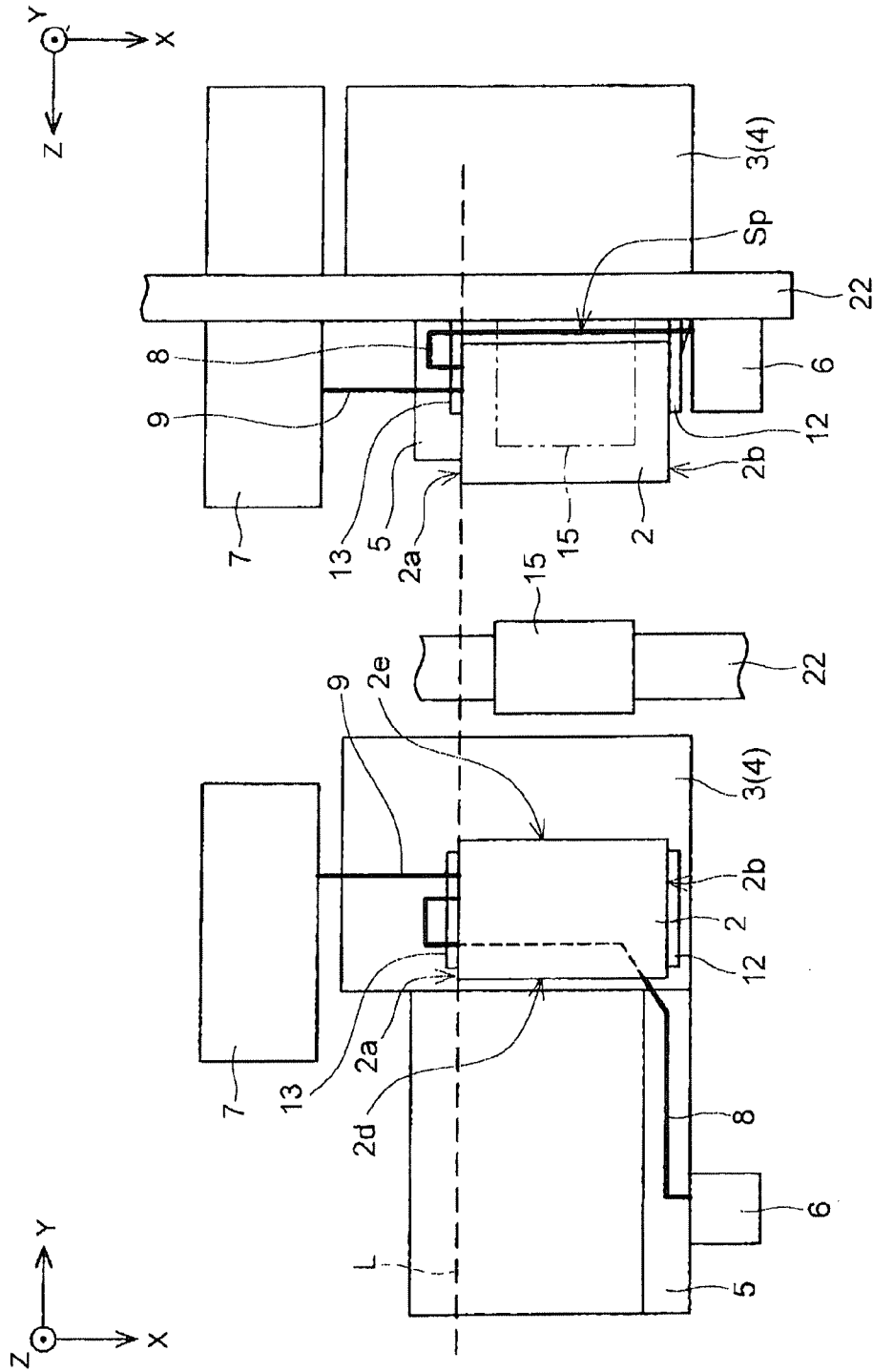

CABLE ROUTING STRUCTURE

INCORPORATION BY REFERENCE

The disclosure of Japanese Patent Application No. 2012-263578 filed on Nov. 30, 2012 including the specification, drawings and abstract is incorporated herein by reference in its entirety.

BACKGROUND OF THE INVENTION

1. Field of the Invention

The invention relates to a cable routing structure.

2. Description of Related Art

A wide range of devices are mounted in a motor compartment of an electric vehicle, compared with a conventional engine vehicle. In terms of large devices, first, an electric motor for running (hereinafter, also referred to as "running motor") is provided. Next, there is a power control unit (i.e., an inverter) that converts direct current (DC) output of a battery to alternating current (AC), which it then supplies to the electric motor. In addition, there is an auxiliary battery that supplies power to an auxiliary system (i.e., accessories), an electric compressor of an air conditioner, and a fuse box and the like. With a hybrid vehicle, an engine is also mounted in addition to the electric motor, in the motor compartment.

The term "accessories" refers to devices that are driven by voltage lower than the rated voltage of the running motor, and that are driven by the battery of a conventional engine vehicle. Typical accessories include a room lamp, a car navigation system, and power windows and the like. A control board in a power control unit that drives the running motor is also an accessory. Hereinafter, the power control unit will simply be referred to as "PCU". Also, a battery that stores power for driving the electric motor will be referred to as the "main battery", in order to differentiate it from the auxiliary battery.

Japanese Patent Application Publication No. 2010-264793 (JP 2010-264793 A) describes one example of a layout of devices in a motor compartment. JP 2010-264793 A illustrates a layout of a motor compartment of a hybrid vehicle, in which an engine and an auxiliary battery are arranged next to a PCU. Also, Japanese Patent Application Publication No. 2004-328870 (JP 2004-328870 A) describes an example in which an inverter is mounted above an electric motor. In JP 2004-328870 A, the inverter is fixed, via a gap, above the electric motor. The inverter is fixed above the motor by a fitting. Fittings that fix the inverter and the like are often referred to as brackets. In this specification as well, fittings for fixing the inverter and PCU will be referred to as brackets.

Many of the devices mounted in the motor compartment of an electric vehicle are electrical devices, and cables for transferring electric power and signals are connected to these devices. That is, more cables have to be routed in the motor compartment of an electric vehicle than have to be routed in the motor compartment (i.e., engine compartment) of a conventional engine vehicle. However, the power supplied from the PCU (i.e., the inverter) to the electric motor is high current, so it is better that the cables for connecting the PCU to the electric motor be short. Therefore, the PCU is arranged near the electric motor. This arrangement of the PCU may limit the cable routing structure. That is, several cables are connected to the PCU, but depending on the device layout around the PCU, it may be difficult to ensure the routing space for these cables. The technology described in this specification provides a preferable cable routing structure in a motor compartment.

SUMMARY OF THE INVENTION

A first aspect of the invention relates to a cable routing structure that includes a drive train, an electric motor that is housed within the drive train, and a power control unit configured to convert electric power of a battery to alternating current and supply the alternating current to the electric motor. The power control unit is fixed to an upper portion of the drive train. Also, on-board components are arranged on both sides of the power control unit in a lateral direction of a vehicle. The cable routing structure also includes an electrical component that is arranged on a side of a plane on which the power control unit is present, the plane includes a side surface of the power control unit that faces toward a front or a rear of the vehicle, and a first cable connecting the power control unit to the electrical component. A first end of the first cable is connected to the side surface of the power control unit. A second end of the first cable is connected to the electrical component. Furthermore, the first cable is routed through a space defined by the power control unit and the drive train.

The cable routing structure according to this aspect makes it possible to route the cable over a short distance by routing the cable using the space below the power control unit, when some sort of on-board components are arranged on both sides of the power control unit in the lateral direction of the vehicle such that it is difficult to ensure space for running the cable between these components and the power control unit. In other words, the technology described in this specification obviates the need to route the cable in a roundabout way.

Also, the power control unit may be fixed to the upper portion of the drive train via a bracket.

Further, the cable routing structure according to the aspect described above may also include a battery that supplies electric power to the electrical component via a circuit inside the power control unit, and this battery may be arranged in a position facing the side surface of the power control unit to which the first end of the first cable is connected. Moreover, the cable routing structure may also include a second cable that is connected to the battery and the power control unit. A third end of the second cable that is positioned on the power control unit side of the second cable may be connected to the side surface of the power control unit to which the first end of the first cable is connected.

According to this routing structure, the cable routing structure described above is able to shorten the cable that carries high current between the PCU and the main battery. By connecting the cable between the PCU and the main battery, and the cable between the PCU and the electrical component, close together to the PCU, the connecting structures of these in the PCU are able to be made smaller, and as a result, the PCU is able to be made smaller.

Also, a second aspect of the invention relates to a cable routing structure that includes a drive train, an electric motor that is housed within the drive motor, and a power control unit configured to convert electric power of a battery to alternating current and supply the alternating current to the electric motor. This power control unit is fixed to an upper portion of the drive train. Also, on-board components are arranged on both sides of the power control unit in a lateral direction of a vehicle. The cable routing structure also includes an electrical component arranged farther forward than the power control unit in a longitudinal direction of the vehicle, and a first cable that connects the power control unit to the electrical component. A first end of the first cable is connected to a rear surface of the power control unit that faces toward a rear of the vehicle. A second end of the first cable is connected to the electrical component. Furthermore, the first cable is routed through a space defined by the power control unit and the drive train.

The cable routing structure according to this aspect makes it possible to route the cable over a short distance by routing the cable using the space below the power control unit, when some sort of on-board components are arranged on both sides of the power control unit in the lateral direction of the vehicle such that it is difficult to ensure space for running the cable between these components and the power control unit. In other words, the technology described in this specification obviates the need to route the cable in a roundabout way.

Also, the cable routing structure according to the aspect described above may also include a battery that supplies electric power to the electrical component via a circuit inside the power control unit, and the battery may be arranged in a position facing the rear surface of the power control unit. Further, the cable routing structure may also include a second cable that is connected to the battery and the power control unit. A third end of the second cable is positioned on the power control unit side of the second cable. The third end of the second cable may be connected to the rear surface of the power control unit.

According to this routing structure, the cable routing structure described above is able to shorten the cable that carries high current between the PCU and the main battery. By connecting the cable between the PCU and the main battery, and the cable between the PCU and the electrical component, close together to the PCU, the connecting structures of these in the PCU are able to be made smaller, and as a result, the PCU is able to be made smaller.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 1A to 1C are views of a device layout in a motor compartment according to one example embodiment of the invention, with FIG. 1A being a plan view of the motor compartment, FIG. 1B being a side view of the motor compartment, and FIG. 1C being a front view of the motor compartment; and FIGS. 2A and 2B are device layout views from which some of the devices shown in FIGS. 1A to 1C are omitted, with FIG. 2A being a plan view, and FIG. 2B being a side view.

DETAILED DESCRIPTION OF EMBODIMENTS

A cable routing structure according to one example embodiment of the invention will now be described with reference to the accompanying drawings. This example embodiment is a cable routing structure in a motor compartment of a hybrid vehicle provided with an electric motor and an engine. FIGS. 1A to 1C are views showing a frame format of a device layout of a motor compartment 29 of the hybrid vehicle. FIG 1A is a plan view, and FIG. 1B is a side view. Also, FIGS. 2A and 2B are views from which several devices shown in the plan view and side view of FIG. 1 have been omitted in order to make the layout around a power control unit (PCU) 2 easier to see. In the drawings, the positive direction along the X axis corresponds to a direction toward the front of the vehicle, the Y axis corresponds to a left-right (lateral) direction, and the positive direction along the Z axis corresponds to a direction upward with respect to the vehicle.

Of the devices that are mounted in the motor compartment 29, those that are largest are an engine 5 and a drive train 3. These are arranged lined up in the left-right (lateral) direction of the vehicle. The drive train 3 includes an electric motor 4 for running. A gear set that combines/divides the output of the engine 5 and the electric motor 4 is housed inside the drive train 3. Although not shown, a planetary gear set is housed in the drive train 3. An output shaft of the electric motor 4 is connected to one of a sun gear, a ring gear, and a planetary carrier of the planetary gear set, an output shaft of the engine 5 is connected to another of the sun gear, the ring gear, and the planetary carrier of the planetary gear set, and a main output shaft (i.e., a shaft that transmits torque to driving wheels) is connected to the remaining one of the sun gear, the ring gear, and the planetary carrier of the planetary gear set. The planetary gear set combines the outputs of the engine 5 and the electric motor 4 and transmits the combined output to the main output shaft, or divides the output of the engine 5 between the electric motor 4 and the main output shaft, and transmits that output. In the latter case, the engine 5 drives the electric motor 4 to generate power while simultaneously supplying driving force to the vehicle.

A PCU 2 is fixed above the drive train 3. A side surface of the PCU 2 that faces toward the front of the vehicle will be referred to as a "front surface $2b$", a side surface of the PCU 2 that faces toward the rear of the vehicle will be referred to as a "rear surface $2a$", and sides of the PCU 2 that face in the left-right directions of the vehicle will be referred to as "side surfaces $2d$ and $2e$". The PCU 2 is fixed by brackets 12 and 13, above the drive train 3 with a space Sp between the PCU 2 and the drive train 3. These brackets are fittings for fixing the PCU 2, and are attached to the front surface $2b$ and the rear surface $2a$ of the PCU 2.

A height of the engine 5 is higher than a height of the drive train 3, so the engine 5 faces one of the side surfaces $2d$ of the PCU 2. Also, an auxiliary battery 15 is adjacent to the other side surface $2e$ of the PCU 2. That is, on-board components (i.e., the engine 5 and the auxiliary battery 15) are arranged on both sides (i.e., one on each side) of the PCU 2 in the left-right (lateral) direction of the vehicle. These on-board components are arranged near the PCU 2.

The auxiliary battery 15 is a battery for supplying power to devices with a lower rated voltage than the electric motor 4, such as a room lamp and a car navigation system. The auxiliary battery 15 is attached onto a side frame 22 that is part of a vehicle frame and that extends in a longitudinal (front-rear) direction inside the motor compartment 29.

A main battery 7 is arranged behind (i.e., to the rear of) the PCU 2. The PCU 2 includes a voltage converter circuit and an inverter circuit. The PCU 2 steps up direct current (DC) power of the main battery 7, and then converts this stepped-up DC power to alternating current (AC) which it then supplies to the electric motor 4. Therefore, the PCU 2 and the main battery 7 are connected together by a power cable 9 (regarded as a second cable). The main battery 7 is arranged facing the rear surface $2a$ of the PCU 2. One end (regarded as a third end) of the power cable 9 is connected to the rear surface $2a$ of the PCU 2, and the other end of the power cable 9 is connected to a front surface of the main battery 7.

The PCU 2 also houses a converter circuit that steps down the voltage of the main battery 7 to an output voltage of the auxiliary battery, and supplies this output to an electric compressor 6 of an air conditioner. The electric compressor 6 is attached onto the engine 5. The bold line denoted by reference character 8 represents a power cable (regarded as a first cable) that connects the PCU 2 to the electric compressor 6. One end (regarded as a first end) of the power cable 8 is connected to the rear surface 2a of the PCU 2, and the other end (regarded as a second end) of the power cable 8 is connected to a rear surface of the electric compressor 6.

The electric compressor 6 is arranged farther forward than the rear surface 2a of the PCU 2, in the longitudinal direction of the vehicle. The broken line denoted by reference character L in FIG. 2A indicates a plane that includes the rear surface 2a of the PCU 2. As is well shown in FIGS. 2A and 2B, the electric compressor 6 is positioned farther forward, in the longitudinal direction of the vehicle, than the plane L that includes the rear surface 2a of the PCU 2. In other words, the electric compressor 6 is arranged on the side of the plane L, which includes the rear surface 2a, that the PCU 2 is on. The power cable 8 is routed from the rear surface 2a that is included in the plane L to the electric compressor 6 that is farther forward than the plane L.

Next, the routing structure of the power cable 8 will be described. The power cable 8 extends from the rear surface 2a of the PCU 2, curves downward along the rear surface 2a, and extends toward the front of the vehicle through the space Sp defined by the lower surface of the PCU 2 and the upper surface of the drive train 3. A hole in the longitudinal direction of the vehicle is provided through the bracket 13 that connects the rear surface 2a of the PCU 2 to the drive train 3, and the power cable 8 extends toward the front of the vehicle through this hole. The power cable 8 also curves toward a side of the vehicle midway along the lower surface of the PCU 2, and extends toward the electric compressor 6 from below one of the side surfaces 2d of the PCU 2.

The power cables 8 and 9 extend from the rear surface 2a of the PCU 2. However, in actuality, a connector box is provided on the rear surface 2a of the PCU 2, and the power cables 8 and 9 are connected to the PCU 2 by this connector box.

The device layout around the PCU 2 and the routing structure of the power cables 8 and 9 are summarized as described below. The PCU 2 is attached onto the drive train 3 with the space Sp defined by the PCU 2 and the drive train 3. The engine 5 and the auxiliary battery 15 are arranged on both sides (i.e., one on each side) of the PCU 2 in the lateral direction of the vehicle. The main battery 7 is arranged facing the rear, surface 2a of the PCU 2. The power cable 9 that connects the main battery 7 to the rear surface 2a of the PCU 2 extends linearly in the longitudinal direction of the vehicle. One end of the power cable 8 is connected to the rear surface 2a of the PCU 2, runs down along the rear surface 2a, and extends forward through the space Sp defined by the PCU 2 and the drive train 3, and is routed to the electric compressor 6. The electric compressor 6 is arranged on the side of the plane L, which includes the rear surface 2a of the PCU 2, that the PCU 2 is on (i.e., is arranged on the PCU 2 side of the plane L).

Hereinafter, the routing structure of the power cables 8 and 9 in the motor compartment 29 will be described. The routing structure and the advantages thereof will be summarized. With the routing structure described above, the power cable 8 extends from the rear surface 2a of the PCU 2 to the electric compressor 6 that is positioned farther toward the front of the vehicle than the rear surface 2a, passing through the space Sp between the PCU 2 and the drive train 3. This routing structure enables the PCU 2 to be connected to the electric compressor 6 without greatly diverting the power cable 8, by passing the power cable 8 through the space Sp defined by the PCU 2 and the drive train 3. Also, the power cable 9 that connects the PCU 2 to the main battery 7 connects the side surfaces of the PCU 2 and the main battery 7 that face each other. That is, the power cable 9 connects the main battery 7 and the PCU 2 together over the shortest distance. The length of the power cable 9 is short so power loss in the cable is able to be kept low. Also, by connecting the power cable 8 and the power cable 9 close together to the PCU 2, the connecting structures of these in the PCU 2 are able to be made smaller, and as a result, the PCU 2 is able to be made smaller.

Next, the other components shown in FIG. 1A will be described. Reference character 21a denotes a portion of a body of the vehicle. This portion will be referred to as a suspension tower. A coil spring for front wheel suspension is housed inside this suspension tower. The device denoted by reference character 23 is a fuse box.

Reference character 24 denotes a radiator. The term "electric vehicle" in this specification includes a fuel cell vehicle and a hybrid vehicle that is provided with both an electric motor and an engine. Also, the motor compartment refers to a space within which the running motor is mounted, and corresponds to an engine compartment of a vehicle provided with a conventional engine.

Points to keep in mind regarding the technology described in the example embodiment will now be described. In FIGS. 1A to 1C and 2A and 2B, to facilitate understanding the devices are illustrated somewhat on the small side so that there appears to be plenty of space in the motor compartment 29. However, the devices illustrated in FIGS. 1A to 1C and 2A and 2B are actually much larger and their shapes are not simple cubes. Moreover, not all of the devices that are actually mounted are shown in FIGS. 1A to 1C and 2A and 2B. Various devices are mounted in the motor compartment 29, so there is not much cable routing space. On the other hand, the cables that are connected to the PCU 2 are power cables that carry high current. These power cables are thicker and more difficult to deal with than a typical harness member. The technology described in this example embodiment ensures routing space by providing the space Sp between the drive train 3 and the PCU 2, and passing the power cables through this space Sp. This technology is effective when other devices are positioned very near the side surfaces 2d and 2e of the PCU 2, and cable routing space is unable to be ensured between these, for example.

In this example embodiment, the engine 5 and the auxiliary battery 15 are arranged facing the side surfaces 2d and 2e of the PCU 2. The devices adjacent to the PCU 2 in the left-right direction are not limited to these devices. Also, in the example embodiment, the power cable 8 that extends from the rear surface 2a of the PCU 2 is connected to the electric compressor 6 that is arranged forward of the plane L that includes the rear surface 2a. The device that is connected to the power cable 8 is not limited to the electric compressor 6, as long as it is a device that is arranged farther forward than the rear surface 2a of the PCU 2 and is connected to a power cable that extends from the rear surface 2a of the PCU 2. However, the technology described in this specification is particularly effective for a layout in which a device that supplies power from the main battery 7 via a circuit within the PCU 2 is positioned farther forward than the rear surface 2a of the PCU 2. The electric compressor 6 is a representative example of this type of device.

Heretofore, specific examples of the invention have been described in detail, but these are merely examples and do not limit the scope of the claims. The technology described in the claims also includes various modifications of the specific examples described above. Also, the technical elements illustrated in the specification and the drawings display technical utility both alone and in various combinations. Further, the technology illustrated in the specification and the drawings simultaneously achieves a plurality of objects, and has technical utility by simply achieving one of these objects.

What is claimed is:

1. A cable routing structure comprising:
a drive train;
an electric motor housed within the drive train;
a power control unit configured to convert electric power of a battery to alternating current and supply the alternating current to the electric motor, the power control unit being fixed to an upper portion of the drive train, and on-board components being arranged on both sides of the power control unit in a lateral direction of a vehicle;
an electrical component arranged on a side of a plane on which the power control unit is present, the plane including a side surface of the power control unit that faces toward a front or a rear of the vehicle; and
a first cable connecting the power control unit to the electrical component, a first end of the first cable being connected to the side surface of the power control unit, a second end of the first cable being connected to the electrical component, and the first cable being routed through a space defined by the power control unit and the drive train.

2. The cable routing structure according to claim 1, wherein the power control unit is fixed to the upper portion of the drive train via a bracket.

3. The cable routing structure according to claim 2, further comprising:
a battery supplying electric power to the electrical component via a circuit inside the power control unit, the battery being arranged in a position facing the side surface of the power control unit to which the first end of the first cable is connected; and
a second cable connected to the battery and the power control unit, a third end of the second cable being positioned on the power control unit side of the second cable, and the third end of the second cable being connected to the side surface of the power control unit to which the first end of the first cable is connected.

4. A cable routing structure comprising:
a drive train;
an electric motor housed within the drive train;
a power control unit configured to convert electric power of a battery to alternating current and supply the alternating current to the electric motor, the power control unit being fixed to an upper portion of the drive train, and on-board components being arranged on both sides of the power control unit in a lateral direction of a vehicle;
an electrical component arranged farther forward than the power control unit in a longitudinal direction of the vehicle; and
a first cable connecting the power control unit to the electrical component, a first end of the first cable being connected to a rear surface of the power control unit that faces toward a rear of the vehicle, a second end of the first cable being connected to the electrical component, and the first cable being routed through a space defined by the power control unit and the drive train.

5. The cable routing structure according to claim 4, wherein the power control unit is fixed to the upper portion of the drive train via a bracket.

6. The cable routing structure according to claim 5, further comprising:
a battery supplying electric power to the electrical component via a circuit inside the power control unit, the battery being arranged in a position facing the rear surface of the power control unit; and
a second cable connected to the battery and the power control unit, a third end of the second cable being positioned on the power control unit side of the second cable, and the third end of the second cable being connected to the rear surface of the power control unit.

* * * * *